March 6, 1934.                A. LINDSKOG                1,950,314
VALVE LUBRICATING MECHANISM
Filed Dec. 15, 1933
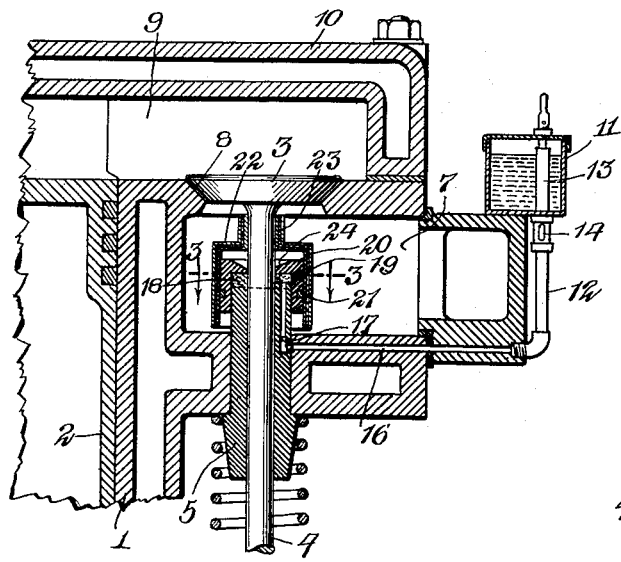
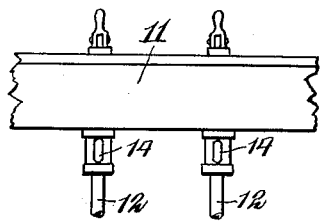
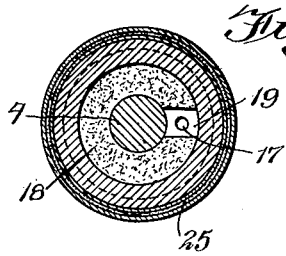
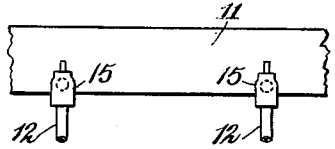
WITNESSES
INVENTOR
Arvid Lindskog
BY
ATTORNEYS Patented Mar. 6, 1934

1,950,314

UNITED STATES PATENT OFFICE 1,950,314

VALVE LUBRICATING MECHANISM

Arvid Lindskog, New York, N. Y.

Application December 15, 1933, Serial No. 702,623

6 Claims. (Cl. 184—6)

This invention relates to valve lubricating mechanism, and more especially to an improved means for lubricating the valves of internal combustion engines, an object of the invention being to provide improved means for insuring the proper supply of lubricant to the valve stem and sleeve therefor, and also to provide an improved arrangement of hood which protects the stem and the sleeve from heat and flame.

A further object is to provide a construction and arrangement of parts, in which a hood carried by the valve stem reciprocates on a piston carried by the sleeve so that these parts function somewhat after the manner of a pump to draw oil into contact with the stem and maintain the stem nicely lubricated under all conditions.

With these and other objects in view, the invention consists in certain novel features of construction and combinations and arrangements of parts, all of which will be more fully hereinafter described and pointed out in the claims.

In the accompanying drawing,—

Figure 1 is a view mainly in vertical section illustrating my invention in connection with a valve of an internal combustion engine;

Figure 2 is a fragmentary view in elevation of the lubricant supply tank and connected parts;

Figure 3 is an enlarged view in transverse section on the line 3/3 of Figure 1; and Figure 4 is a fragmentary detail view illustrating a modification.

1 represents the cylinder and 2 the piston of an internal combustion engine. It is to be understood that my improved lubricating mechanism is applied to all of the valves, both inlet and exhaust, of an internal combustion engine, but for purposes of description we will assume that in Figure 1 the invention is illustrated in connection with an exhaust valve 3. This exhaust valve is of the ordinary tappet type having a stem 4 fixed thereto, and movable in a sleeve 5. 6 represents the exhaust manifold which communicates with a chamber 7 of the valve 3 and controls a port 8 between this chamber 7 and a passage 9 in the head 10 of the engine.

I preferably employ at some convenient location, preferably adjacent the engine itself, a lubricant reservoir or tank 11, with individual pipes 12 connecting said tank or reservoir with the respective valve stems. In Figures 1 and 2 the supply of lubricant is indicated as controlled by the ordinary drip mechanism 13 with sight gages 14 in the several lines, although it is clearly understood that the invention is not limited to the specific manner of controlling the escape of lubricant from the tank, and I illustrate in Figure 4, more or less diagrammatically, the idea of providing force pumps 15 at the outlets of the tank 11 which eject or force at each operation a known quantity of lubricant through the pipes 12, and this force feed mechanism may be controlled by any suitable means which forms no part of the present invention.

The pipes 12 communicate with ducts 16 in the walls of the engine, and more specifically in the wall of the chamber 7, and each duct 16 communicates with a duct or passage 17 extending upwardly and longitudinally of the sleeve 5 to the upper end of said sleeve, and on the upper end of the sleeve 5 a washer 18 is located around the stem 4 and this washer is preferably of felt so that it will absorb and hold a certain quantity of lubricant in contact at all times with the stem 4. To insure proper feed of the lubricant and prevent any possibility of the washer 18 cutting off this feed the washer is preferably segmental in form, and the end of the sleeve is made with an enlargement or lug 19 at the outer end of the passage or duct 17, as clearly shown in Figure 3 of the drawing.

The reference numeral 20 is employed to indicate a cup-like piston which fits over the upper end of the sleeve 5 above the washer 18, and has fixed relation to the sleeve and may have a suitable packing ring 21 around the same. A protecting hood 22 fits the piston 20, is open at its lower end, and has a reduced sleeve 23 thereon which fits the stem 4 and is secured to the stem in any approved manner. This hood 22 is caused to reciprocate on the piston 20 whenever the valve 3 is opened and closed, and this movement of the hood in its relation to the piston constitutes in effect a pump which insures a movement of the lubricant so that it will saturate the washer 18, will be drawn through the piston 20 to the surface of the stem, and will be forced down the stem within the sleeve 5 so that the valve stem will be sufficiently lubricated at all times.

The upper end of the piston 20 is preferably dished, as indicated at 24, to direct lubricant above the piston toward the stem on the down stroke of the hood. This hood 22 may, of course, be made in various ways but I preferably form the same with an inner lining 25 of asbestos, so that in effect the cup constitutes inner and outer metal members with the lining 25 between them to prevent the transfer of heat. It will thus be noted that my improved lubricating mechanism not only includes novel means for supplying lubricant to the stem, but also the piston and hood or cylinder insure a forced movement of the lubricant around the stem; furthermore, the hood protects the stem, the upper end of the sleeve and adjacent parts from flame and the heat temperatures of the manifold and engine cylinder.

While I have indicated and described what I believe to be the preferred embodiment of my invention, it is to be distinctly understood that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. A lubricant feeding mechanism for the valve stem of an internal combustion engine comprising a piston adapted to be located on the guide sleeve of the valve stem, a hood fixed to the valve stem and reciprocating on the piston constituting a pump, and means for directing lubricant into said pump.

2. A lubricant feeding mechanism for the valve stem of an internal combustion engine comprising a piston adapted to be located on the guide sleeve of the valve stem, a hood fixed to the valve stem and reciprocating on the piston constituting a pump, means for directing lubricant into said pump, said means including a lubricant reservoir, and a pipe connected to the reservoir and communicating with a duct in the sleeve.

3. A lubricant feeding mechanism for the valve stem of an internal combustion engine comprising a piston adapted to be located on the guide sleeve of the valve stem, a hood fixed to the valve stem and reciprocating on the piston constituting a pump, means for directing lubricant into said pump, said means including a lubricant reservoir, and a pipe connected to the reservoir and communicating with a duct in the sleeve, said hood having a non-conducting lining interposed between an inner and outer metallic covering.

4. The combination with an internal combustion engine having a valve, a stem on the valve, a sleeve constituting a guide for the stem and having a lubricant duct therein, a lubricant reservoir outside of the engine, a pipe directing lubricant from the reservoir to the duct in the sleeve, an absorbent washer around the stem on the sleeve, a cup-like piston at the upper end of the sleeve secured to the sleeve, and a hood secured to the stem and movable on the piston.

5. The combination with an internal combustion engine having a valve, a stem on the valve, a sleeve constituting a guide for the stem and having a lubricant duct therein, a lubricant reservoir outside of the engine, a pipe directing lubricant from the reservoir to the duct in the sleeve, an absorbent washer around the stem on the sleeve, a cup-like piston at the upper end of the sleeve secured to the sleeve, a hood secured to the stem and movable on the piston, said washer segmental in form, and a lug or enlargement on the end of the stem located at the ends of the washer and having an opening communicating with the duct in the sleeve.

6. A lubricating mechanism for the valves of internal combustion engines including a reservoir outside of the engine, pipes extending from the reservoir, ducts or passages in the walls of the engines and in the guide sleeves of the valves for directing lubricant to the stems of the valves, and suction means on the valve stems and sleeves whereby when the valves are opened and closed lubricant will be caused to move in contact with the stems of the valves.

ARVID LINDSKOG.